United States Patent Office 3,555,073
Patented Jan. 12, 1971

3,555,073
SUBSTITUTED ALKANOIC ACIDS
Peter Baumann, Fullinsdorf, Basel-Land, Markus Zimmermann, Riehen, and Franz Hafliger and Andre R. Gagneux, Basel, Switzerland, assignors to Geigy Chemical Corporation, Greenburgh, N.Y., a corporation of Delaware
No Drawing. Continuation of application Ser. No. 514,102, Dec. 15, 1965, which is a continuation-in-part of application Ser. No. 263,422, Mar. 7, 1963. This application June 12, 1967, Ser. No. 645,537
Claims priority, application Switzerland, Mar. 9, 1962, 2,878/62
Int. Cl. C07c *149/21;* A61k *25/00*
U.S. Cl. 260—468                                10 Claims

ABSTRACT OF THE DISCLOSURE

1'-adamantylthioacetic acid and alpha phenyl or alpha lower alkyl substituted 1'-adamantylthioacetic acids have been prepared. They are valuable intermediates in the production of penicillins and themselves possess antiviral properties.

---

This application is a continuation of our copending application, Ser. No. 514,102 filed Dec. 15, 1965, now abandoned, which is a continuation-in-part of our patent applications, Ser. No. 263,421 filed Mar. 7, 1963 now abandoned, and Ser. No. 442,529 filed Mar. 24, 1965, the latter being a continuation-in-part of our application Ser. No. 263,422 filed March 7, 1963, now abandoned.

This invention relates to substituted alkanoic acids, and more particularly to alkanoic acids which are substituted by an adamantylthio or adamantyloxy radical. These acids are valuable intermediates in the production of correspondingly substituted penicillins. Moreover they possess themselves valuable therapeutical properties, set forth hereinafter.

Penicillins such as the naturally occurring Penicillin G suffer from the drawbacks of being easily destroyed by acids such as hydrochloric acid in the gastric juices, and of being inactivated by penicillinase, an enzyme which is produced, for instance, by certain strains of gram-positive bacteria which thus become known as being "penicillin-G-resistant."

Compounds of the formula

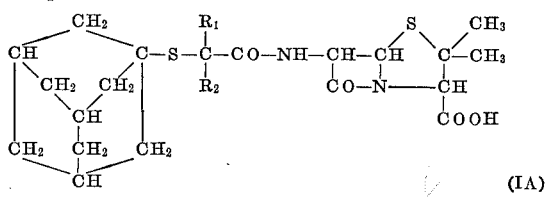

(IA)

and compounds of the formula

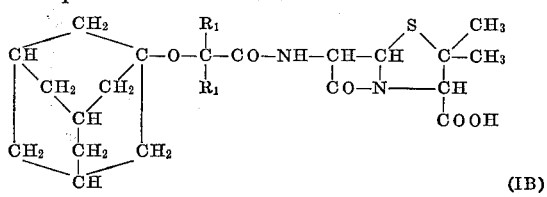

(IB)

wherein $R_1'$ represents hydrogen, an aliphatic, cycloaliphatic, 1 to 5 carbon atoms, cycloalkyl, preferably with 5 to 6 carbon atoms, or mononuclear carbocyclic aryl, particularly phenyl, lower alkyl-phenyl, chlorophenyl, bromophenyl, lower alkoxyphenyl, cyanophenyl or such halogeno-lower alkyl-phenyl as, especially, trifluoromethyl-phenyl;

$R_2$ represents hydrogen or a lower alkyl radical; and wherein $R_1$ and $R_2$ together can be a polymethylene bridge of 2 to 7 carbon atoms, and the salts of these compounds obtained by neutralization of the free acids of Formula I(A and B) with inorganic and organic bases possess an excellent antibacterial action against gram-positive bacteria, lower hygroscopicity and high heat resistance. Their antibacterial action also extends to strains of the aforesaid bacteria which are resistant to Penicillin G. They can be used therapeutically in the case of infectious diseases with gram-positive bacteria that are resistant to Penicillin G.

"Lower" as used herein in connection with "alkyl" and the like radicals means "with 1 to 5 carbon atoms" unless stated otherwise.

The compounds of Formula I (A and B) are produced by a process according to the invention, which comprises:
  (A) reacting
  (1) a reactive ester of a mercapto or hydroxyl compound of the formula

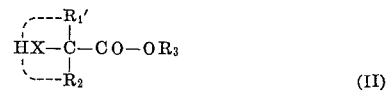

(II)

wherein $x$ represents S or O,
  $R_1'$ represents hydrogen, an aliphatic, cycloaliphatic, aromatic or araliphatic radical,
  $R_2$ represents hydrogen or a lower alkyl radical,
  $R_1'$ and $R_2$ together can be a polymethylene bridge of 2 to 7 carbon atoms, and
  $R_3$ represents a lower alkyl radical, for example the bromide, the chloride, the lower alkane-, especially methane sulfonic acid ester or the p-toluene sulfonic acid ester of a compound of Formula II with heating preferably at 60° to 200° C. and advantageously with the exclusion of air, in a suitable inert organic solvent particularly diethylene glycol dimethyl ether; with
  (2) a reactive salt of 1-adamantanethiol or 1-adamantanol, in particular the alkali metal salts thereof, which may be formed in situ, whereby the corresponding α-(adamant-1-ylthio)- or α-adamant-1-yloxy)-carboxylic acid alkyl ester is obtained;
  (B) saponifying the latter compound, for example by moderate heating in a alkanolic alkali liquor, and then, if desired, isolating the free acid by acidification, for example with aqueous alkanolic hydrochloric acid, thereby obtaining the corresponding free adamantylthio or adamantyloxy alkanoic acid of, respectively, the formulas

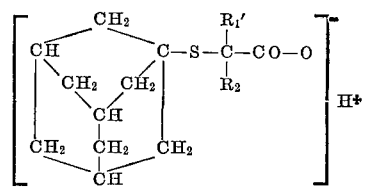

III (A)

and

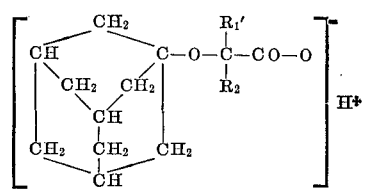

III (B)

wherein $R_1'$ and $R_2$ have the meanings given hereinbefore; or, depending on the nature of the alkaline medium and the base used, the corresponding salt of said acid;

(C) reacting the free acid of Formula III (A or B), if desired, with (α) thionyl chloride, phosphorus pentachloride or phosphorus oxychloride or oxybromide at a temperature between room temperature (20° C.) and reflux temperature of the resulting mixture, depending on the stability of the acid involved, and, when necessary, a hydrocarbon solvent such as benzene, in order to produce the corresponding acyl chloride or bromide, or (β) with acetic acid anhydride or thionyl chloride, with heating between 40° C. and reflux temperature of the mixture in order to produce either a mixed anhydride of an acid of Formulas III (A and B) and acetic acid or the anhydride of an acid of Formulas III (A and B), or (γ) with a chloroformic ester of the formula

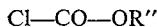

wherein R″ is lower alkyl, especially ethyl or isobutyl, or benzyl, p-nitro benzyl, allyl or methallyl, at about 0° C., thereby obtaining so-called "mixed anhydrides" of the acids of Formulas III (A and B) which are carbonic acid semiesters of, respectively, the formulas

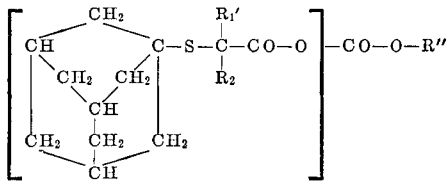

and

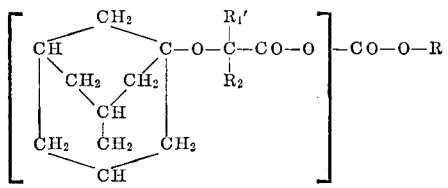

wherein $R_1'$, $R_2$ and R″ have the aforesaid meanings.

When $R_1$ and $R_2$ in Formulas III (A and B) have different meanings, the products are obtained as racemates which can be resolved if desired into their antipodes in a conventional manner. Preferably, the resolution is realized by reacting the racemic acids of Formula III (A or B) with optically active organic bases, for example, with (+) or (—)-α-phenyl-ethyl-amine in suitable solvents such as aqueous ethanol. The precipitated optically active salt is recrystallized and, if desired, the optically active acid is liberated, and then further reacted as described above. Optically active acids of the Formulas III (A and B) can also be obtained if a correspondingly optically active alkyl ester of Formula II is used as starting material in the first process mentioned.

Another method leading to the esters of the acids represented by Formulas III (A and B) consists in reacting compounds of Formula II with reactive esters of 1-adamantanol or 1-adamantanethiol in the presence of acid binding agents. The reaction may, for example, be carried out at temperatures between 100 and 180° in an excess of the reaction partner of the Formula II or in an inert organic solvent.

The reactive 1-adamantanol esters should preferably be 1-bromo-adamantane, and also 1-chloro- or 1-iodo-adamantane, 1-adamantanol-p-toluene sulfonate, -methylsulfonate or -trifluoro-acetate.

An amount of a tertiary organic base, which is equivalent to the quantity of the reactive 1-adamantanol ester may serve sa an acid-binding agent, preferably triethylamine, pyridine and collidine. Salts of the free acid of Formulas III (A and B) obtained either directly from the alkaline phase (described in step (B)), or by neutralization of the free acid, or by exchange of cations of the said salts for those of another inorganic or organic base, are, for example, the sodium, potassium, lithium, ammonium, ethyl ammonium, triethyl ammonium, piperidinium, ethanol ammonium, diethanol ammonium, or N,N-diethylethanol ammonium salts or the corresponding magnesium, calcium or ethylenediammonium salts in which one equivalent weight of the latter cations is neutralized by two equivalent weights of the anion of an acid falling under one of the Formulas III (A or B).

These salts are starting intermediates for the next following steps, in that they can be isolated in a conventional manner and then used for preparing the free acid therefrom in a pure form, which can then be reintroduced into step (C) of the above-described process according to the invention.

The acids of the Formulas III (A and B) are also produced, for example, by reacting a reactive ester of 1-adamantanol or 1-adamantanethiol, in the presence of an acid binding agent, with a compound of general Formula II as described in steps A and B, supra, or reacting such ester with a metal compound of a compound of general Formula II, converting the α-(adamant-1-oxy) or α-(adamantyl-1-thio)-carboxylic acid alkyl ester obtained to the free acid or to a salt and, if desired, converting the free acid or the salt into another salt with an inorganic or organic base.

For example, the first step of the reaction is performed at temperatures between about 100 and 180° in an excess of the compound to be reacted of the general Formula II or in an inert organic solvent such as diethylene glycol dimethyl ether.

Particularly suitable reactive salts of 1-adamantol are its alkali metal salts which may optionally be formed in situ.

The reaction is performed, for example in a suitable organic solvent such as diethylene glycol dimethyl ether, while heating and, advantageously while excluding air.

Sodium, potassium, lithium, ammonium, magnesium or calcium salts, or salts of organic bases such as ethylamine, diethylamine, triethylamine, ethanolamine, diethanolamine, N-ethyl-diethanolamine, diethylaminoethanol, pyrrolidine, piperidine, N-ethylpiperidine, 1-(β-hydroxyethyl)-piperidine, morpholine, procaine, benzylamine, dibenzylamine, 1 - phenyl - propyl - (2) - amine and other amines, which are often used for producing penicillin salts, are salts of acids of the Formulas I which may be produced in accordance with the invention.

The compounds falling under Formulas III (A and B), and especially those of the formula

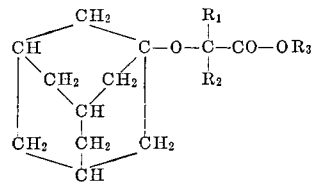

(V)

wherein $R_1$ and $R_2$ have the same meanings as in Formula I, and $R_3$ is a member selected from the group consisting of hydrogen, lower alkyl, a monovalent cation and a normal equivalent of a polyvalent cation, i.e., the free acids, in which $R_3$ represents hydrogen, their esters, in which $R_3$ represents lower alkyl, and their non-toxic salts with inorganic and organic bases as defined hereinbefore have excellent antiviral activity and, at the same time, have relatively low toxicity. They are suitable as active ingredients in agents for the treatment of virus diseases such as, e.g. various forms of influenza. Their antiviral activity against the influenza A virus (PR 8), for example in the mouse, can be established by subcutaneous and oral administration.

Moreover, the compounds falling under the Formulas III (A and B) stimulate the contraction of the gall bladder and are then useful as cholagogues.

Monovalent and polyvalent cations mentioned in the definition of $R_3$ supra, are especially those of the bases enumerated hereinafter.

The agents for the treatment of virus diseases according to the invention contain at least one acid of general Formula V or at least one non-toxic salt thereof as active ingredient in a usual form for oral, rectal, local or parenteral administration. Suitable non-toxic salts are those with pharmacologically acceptable inorganic and organic bases, i.e. with bases which, in the dosages usual, have no physiological action in themselves or which bring about a desired effect, for example, an antibacterial or, in forms for parenteral administration, particularly a local anesthetic action. Suitable salts are, for example, sodium, potassium, magnesium, calcium and ammonium salts as well as salts with ethylamine, triethylamine, ethanolamine, diethanolamine, diethylaminoethanol, ethylenediamine, benzylamine, dibenzylamine, procaine, pyrrolidine, piperidine, morpholine, N-ethyl-piperidine or N-(2-hydroxy-ethyl)-piperidine.

Dosage units for peroral administration contain, as active ingredient, preferably between 1% and 90% of an acid of the general Formula V or of a non-toxic salt thereof. They are produced, for example, by combining the active substance with solid, pulverulent carriers such as lactose, sucrose, sorbitol, mannitol; starches such as potato starch, maize starch or amylopectin, also laminaria powder or citrus pulp powder; cellulose derivatives or gelatin, optionally with the addition of lubricants such as magnesium or calcium stearate or polyethylene glycols (carbowax) of suitable molecular weights, to form tablets or dragée (sugar coated tablet) cores. The latter are coated, for example with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between various contents of active ingredient.

Examples of dosage units for rectal administration are suppositories which consist of a combination of an acid of general Formula V or of a suitable non-toxic salt thereof with a neutral fatty foundation, or also gelatin rectal capsules which contain a combination of the active substance or of a suitable salt thereof with polyethylene glycols (carbowax) of suitable molecular weight.

Ampoules for parenteral, particularly intravenous, intramuscular or subcutaneous administration preferably contain a water soluble, non-toxic salt of an acid of the general Formula V in a concentration of, preferably, 0.5–10%, optionally with suitable stabilising agents or buffer substances, in aqueous solution.

Further application forms, particularly for the treatment of virus infections of the respiratory organs, are syrups and also aerosols and, for the local treatment of virus disease, ointments and powders. All these forms for application can be prepared using the carriers, diluents and additives usual for this purpose.

The following examples further illustrate the production of tablets and dragées.

EXAMPLE I 250 g. of active substance, e.g. α-(adamant-1-yloxy)-β-methyl-butyric acid or its sodium salt are mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicon dioxide are mixed in and the mixture is pressed into 10,000 tablets each weighing 100 mg. and containing 25 g. of active substance. If desired, the tablets can be grooved for better adaptation of the dosage.

EXAMPLE II

A granulate is produced from 250 g. of active substance, e.g. L-α-(adamant-1-yloxy)-propionic acid or its sodium salt, 175.90 g. of lactose and the alcoholic solution of 10 g. of stearic acid. After drying, 56.60 g. of colloidal silicium dioxide, 165 g. of talcum, 20 g. of potato starch and 2.50 g. of magnesium stearate are mixed in and the mixture is pressed into 10,000 dragée cores. These are then coated with a concentrated syrup of 502.28 g. of crystallized saccharose, 6 g. of shellack, 10 g. of gum arabic, 0.22 g. of dyestuff and 1.5 g. of titanium dioxide and dried. The dragées obtained each weigh 120 mg. and contain 25 mg. of active substance.

The following non-limitative examples further illustrate more in detail the preparation of the new substituted alkanoic acids and the preparation of derivatives of 6-aminopenicillanic acid therefrom. The temperatures are given therein in degrees centigrade (g.=gram, mMol=millimole, ml.=milliliter, torr=mm. Hg).

EXAMPLE 1

(a–1) α - (adamant - 1 - yloxy) -acetic acid.—16 g. (75 millimoles of 1 bromo - adamantane are refluxed in 80 ml. of glycolic acid-butyl ester and 10 ml. of collidine for 15 hours. After evaporation of excess glycol acid ester at 86°/16 torr the reaction product is dissolved in 500 ml. ether, extracted three times with 500 ml. portions of water, once with 500 ml. of 0.5 HCl and finally again with 500 ml. of water. After drying over MgSO$_4$ and evaporation, the resulting residue is refluxed with 500 ml. ethanol, 25 g. NaOH and 50 ml. of water for 12 hours. After evaporation of the alcohol, 500 ml. of water, charcoal and Hyflo (kieselguhr) are added, the mixture is heated to boiling, filtered, and finally acidified at 0- with concentrated hydrochloric acid.

On filtering and washing with water, 13 g. of the crude acid are obtained. M.P. 120–130°.

After recrystallization from cyclohexane, 11 g. (72% of the theoretical yield) of α-(adamant-1-yloxy)-acetic acid are obtained as white crystals which melt at 129–132°.

*Analysis.*—Calc'd for $C_{12}H_{19}O_2N$ (percent): C, 68.86; H, 9.15; N, 6.69. Found (percent): C, 68.80; H, 9.23; N, 6.81.

(a–2) α-(adamant-1-yloxy)-acetic acid by a second method.—18 ml. of sodium amide suspension in toluene (containing 5.9 g. of sodium amide=0.15 mol) are added dropwise at 140° to 15.2 g. (0.1 mol) of 1-hydroxy-adamantane in 250 ml. of diethylene glycol dimethyl ether. After heating for 16 hours at 150–160°, 33.5 g. (0.2 mol) of bromoacetic acid ethyl ester are slowly added, the mixture is refluxed for 16 hours, then cooled and poured into 1 liter of water. The α-(adamant-1-yloxy)-acetic acid ethyl ester which is precipitated is taken up in benzene and the benzene solution is concentrated. Hydrolysis and work up according to the above method produces the α-(adamant-1-yloxy)-acetic acid mentioned therein which melts at 129–131°, 25% of the theoretical yield.

(b) 0.97 g. of α-(adamant-1-xyloxy)-acetic acid and 0.7 ml. of triethylamine are dissolved in 12 ml. of dioxan and 10 ml. of acetone and cooled to a temperature between 0° and 5°. 0.63 ml. of isobutyl chloroformate, dissolved in 5 ml. of dioxan, are added thereto drop by drop, the whole is stirred for 15 minutes at 0° and then separated from residual triethylaminehydrochloride by filtration. A solution of 1.16 g. of 6-aminopenicillanic acid (86.1% pure) in 10 ml. of water and 1 ml. of triethylamine is added to the filtrate which is cooled to 0°. The reaction solution is stirred for 60 minutes at room temperature.

10 ml. of water containing dissolved 1 g. sodium bicarbonate are then added and the whole is washed twice using 25 ml. of ether each time. The aqueous phase is covered with a layer of 20 ml. of methylisobutyl ketone and adjusted to pH 2.1 with 10 N sulfuric acid. After stirring, the largest part of the reaction product passes over into the organic phase as free acid. The layers are separated and the aqueous phase is extracted once more using 5 ml. of methylisobutyl ketone. The methylisobutyl ketone extracts are combined, washed with 5 ml. of water and dried with sodium sulfate. The methyl isobutyl ketone solution is now stirred with a 3%-sodium bicarbonate solution until the aqueous phase has attained a pH of 6.8–7.0. The phases are separated and the organic phase is again extracted with 5 ml. of water. The combined aqueous phases are washed with 25 ml. of ether and liberated from dissolved ether in a rotary evaporator. The clear and almost colorless solution of the resulting sodium salt of α-(adamant-1-yloxy-methyl)-penicillin is lyophilized.

There is obtained a white, voluminous powder, the antibiotic activity of which is determined in near accordance with the agar-incorporation test described by Florey et al. in "Antibiotics," published by Oxford University Press 1949, especially pages 201–203. In this test, a culture of microorganisms grown at 37° C. for 24 hours is transferred with the aid of a velvet-covered sterile stamper to a series of sterile agar plates containing the antibiotic to be tested in varying concentrations. The inoculated plates (sub-cultures) are then incubated at 37° C. for 24 hours. That concentration of the antibiotic at which growth of the respective bacterium is completely inhibited is called the "minimal inhibitory concentration."

The aforesaid final product inhibits the growth of *Staphyloccocus aureus* NCTC 7447 in the above described agar incorporation test at a concentration of less than 0.01 microgram per liter (μg./ml.).

EXAMPLE 2

Optically active α-(adamant-1-yloxy)-propionic acid.—
56 g. (0.26 mol) of 1-bromo-adamantane, 280 ml. of L-lactic acid ethyl ester $[\alpha]_D^{26°} = -9.97°$ (c.=100) and 35 ml. of collidine are refluxed for 15 hours.

After evaporation of the excess lactic acid ester, the residue is taken up in 1 liter of benzene, extracted three times with 1 liter of water, then with 1 liter of 0.5 N aqueous hydrochloric acid and again with 1 liter of water. The organic phase is dried over $MgSO_4$ and concentrated, giving 70 g. of a residue, which is refluxed with 700 ml. ethanol, 35 g. NaOH, and 70 ml. water for 12 hours. The ethanol is distilled off, the residue dissolved in 1 liter of water, clarified with Hyflo and charcoal, acidified, filtered and washed with water to give 49 g., 85%, of crude title acid. After dissolving in benzene, drying over $MgSO_4$ and recrystallization from cyclohexane and benzine, the yield is 41 g., 71%; melting point 95 to 100°. $[\alpha]_D^{26}$ —46.3° (c. 1.58, ethanol).

*Analysis.*—Calc'd for $C_{13}H_{20}O_3$ (percent): C, 69.61; H, 8.99. Found (percent): C, 69.80; H, 9.07.

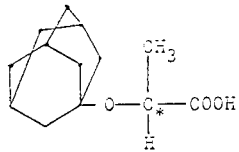

The following pencillin derivatives according to the invention are prepared from the coresponding starting materials in an analogous manner to the procedure of Examples 1 or 2, respectively, via the corresponding acids:

Example:

(3) α-(adamant-1-yloxy)-4'-methyl-benzyl-penicillin, via α-(adamant-1-yloxy)-α-(4'-methyl-phenyl)-acetic acid;

(4) α-(adamant-1-yloxy)-4'-chloro-benzyl-penicillin, via -(adamant-1-yloxy)-α-(4'-chloro-phenyl)-acetic acid;

(5) α-(adamant-1-yloxy)-4'-bromo-benzyl-penicillin, via α-(adamant-1-yloxy)-α-(4'-bromo-phenyl)-acetic acid;

(6) α-(adamant-1-yloxy)-2'-methoxy-benzyl-pencillin, via α-(adamant-1-yloxy)-α-(2'-methoxy-phenyl)-acetic acid;

(7) α-(adamant-1-yloxy)-4'-trifluoromethyl-benzyl-penicillin, via α-(adamant-1-yloxy)-α-(4'-trifluoromethyl-phenyl)-acetic acid;

(8) α-(adamant-1-yloxy)-3',5'-dimethyl-benzyl-penicillin, via α-(adamant-1-yloxy)-α-(3',5'-dimethyl-phenyl)-acetic acid;

(9) α-(adamant-1-yloxy)-n-propyl-pencillin, via α-(adamant-1-yloxy)-n-butyric acid;

(10) α-(adamant-1-yloxy)-isopropyl-pencillin, via α-(adamant-1-yloxy)-iso-butyric acid;

(11) α-(adamant-1-yloxy)-n-amyl-penicillin, via α-(adamant-1-yloxy)-n-caproic acid;

(12 α-(adamant-1-yloxy)-cyclopentyl-methyl-penicillin, via α-(adamant-1-yloxy)-α-cyclopentyl-acetic acid;

(13) α-(adamant-1-yloxy)-cyclopentyl-penicillin, via 1-(adamant-1-yloxy)-cyclopentane-1-carboxylic acid;

(14) α-(adamant-1-yloxy)-n-butyl-penicillin, via α-(adamant-1-yloxy)-n-valeric acid;

(15) α-(adamant-1-yloxy)-benzyl-penicillin, via α-(adamant-1-yloxy)-α-phenyl-acetic acid;

(15a) α-(adamant-1-yloxy)-3'-cyano-benzyl-penicillin, via α-(adamant-1-yloxy)-α-(3'-cyano-phenyl)-acetic acid;

(16) α-(adamant-1-yloxy)-3',4'-methylene-dioxy-benzyl-pencillin, via α-(adamant-1-yloxy)-α-(3',4'-methylene-dioxy-phenyl)-acetic acid;

(17) α-(adamant-1-yloxy)-cyclohexyl-penicillin, via 1-(adamant-1-yloxy)-cyclohexane-1-carboxylic acid.

In the IR-spectra of all the above compounds there is a strong band at 5.62–5.65μ (potassium chloride).

The lowest concentrations at which all of these pencillins inhibit the growth of *Staphylococcus aureus* NCTC 7447 are at 0.1 μg. or even lower.

EXAMPLE 18

Racemic α-(adamant-1-yloxy)-propionic acid (a) This acid is obtained as described in Example 2, using the racemic ethyl lactate instead of the optically active one. A 70% yield of the racemic acid is obtained, M.P. 109–112°.

(b) A yield of 45% of the racemic acid M.P. 109–112° is obtained if, in Example 2, instead of collidine, 7 g. of sodium are used, and optically active or racemic ethyl lactate is used.

(c) Racemic α-(adamant-1-yloxy)-propionic acid, M.P. 110–112°, is also obtained if the sodium salt of 1-hydroxy-adamantane is reacted with ethyl α-bromo-propionate as described in Example 1.

1.14 g. of α-(adamant-1-yloxy)-propionic acid are dissolved in 5 ml. of thionyl chloride and the solution is refluxed for 30 minutes. The excess thionyl chloride is evaporated off in vacuo, the residue is dissolved in benzene and the solution is again evaporated. The residue is dried for 1 hour under high vacuum. The crude acid chloride thus obtained can be used without purification in the reaction with 86.1% 6-amino-penicillanic acid, in order to produce α-(adamant-1-yloxy)-ethyl penicillin.

EXAMPLE 19

α-(Adamant-1-yloxy)-β-methylbutyric acid 16 g. (75 mMol.) of 1-bromo-adamantane, 40 ml. of D,L-α-hydroxy-isovaleric acid ethyl ester and 10 ml. of collidine are refluxed for 16 hours. The excess hydroxy-ester is distilled off and the crude α-(adamant-1-yloxy)-β-methylbutyric acid ethyl ester which remains is worked up as in Example 1. After recrystallization from hexane and cyclohexane, the α-(adamant-1-yloxy)-β-methylbutyric acid obtained melts at 96–98°. Yield: 10 g.=53% of the theoretical yield.

The yield of the last-mentioned acid, in the form of its sodium salt, is about 81% of the theory.

The acid chloride is prepared in the same way as described in Example 18 above from 1.29 g. of α-(adamant-1-yloxy)-β-methyl-butyric acid, M.P. 96–98° (recrystallized from hexane/cyclohexane).

EXAMPLE 20

1-(adamant-1'-yloxy)-cyclopentane carboxylic acid 6.3 ml. of sym. collidine (48 mol) are added to 10 g. of 1-bromo-adamantane (46.5 millimol) dissolved in 20.5 g. of 1 - hydroxy-cyclopentane carboxylic acid methyl ester (142 millimol) and the whole is heated for 20 hours at a bath temperature of 150–160°. After cooling, the reaction mixture is dissolved in ether, and the solution is washed with water, then with dilute hydrochloric acid and finally with saturated sodium chloride solution and dried over sodium sulphate. After evaporating off the ether, the mixture of esters which remains (20 g.) is refluxed for 6 hours with 10 g. of sodium hydroxide (250 millimol) in 200 ml. of 96% ethanol.

About half the ethanol is then distilled off and the residue is dissolved in 1.5 litres of water, the solution is clarified with active charcoal and filtered through Hyflo. The filtrate is treated in the manner described in Example 2. The 1-(adamant-1' - yloxy)-cyclopentane carboxylic acid so obtained melts at 148–153°. After crystalisation from dilute ethanol, it is obtained as shiny platelets which melt at 155–158°; yield 12%.

This compound has the following structural formula:

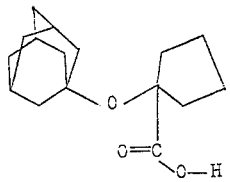

EXAMPLE 21 (a) to (c)

The following compounds are produced by repeating these methods, but using the corresponding hydroxy-carboxylic acid esters:

(a) α-(adamant-1-yl-oxy)-valeric acid, M.P. 60–64° recrystallized from benzene/cyclohexane;

(b) α-(adamant-1-yl-oxy)-isobutyric acid, M.P. 110–115°, recrystallized from hexane;

(c) α-(admant-1-yl-oxy)-α-methylbutyric acid, M.P. 92–94° recrystallized from pentane.

EXAMPLE 22

(a) 107 grams (g.) (0.5 mol) of 1-bromo-adamantane are boiled for three hours under reflux with 76 g. (1 mol) of thiourea and 250 milliliters (ml.) of hydrobromic acid 48% in 500 ml. of glacial acetic acid. The hot reaction mixture is poured onto approximately 1800 g. of ice. The precipitated (1-adamantyl)-isothiuronium-bromide is separated on a suction filter and washed with water and then with methylene chloride. It is then shaken for approximately 14 hours at room temperature with 40 g. sodium hydroxide in 1000 ml. of water and 250 ml. of ethanol. The reaction product is separated on a suction filter, dissolved in benzene, the benzene solution is washed with water and the solvent evaporated. The 1-adamantanethiol, which remains behind as an oil, crystallizes upon trituration with pentane. It is then purified by means of sublimation at 110° under a pressure of 12 mm. Hg; the pure substance melts at 100–102°.

(b) A suspension of 6 g. (0.15 mol) of sodium amide in toluene (total volume 18 ml.) is added gradually to a solution of 16.8 g. (0.1 mol) of 1-adamantanethiol in 250 ml. of diethyleneglycol dimethylether at a bath temperature of 150° whilst being stirred in a nitrogen atmosphere, and the mixture is vigorously refluxed for three hours. 34 g.=24 ml. (0.2 mol) of α-bromoacetic acid ethylester is then added drop by drop for 30 minutes at the same temperature and boiled for approximately a further 14 hours. After cooling, the reaction mixture is poured onto about 1 kilogram of an ice-water mixture and then extracted with toluene. The toluene solution is washed several times with water, and the toluene is evaporated in a rotary evaporator at reduced pressure.

The oily residue which consists of ethyl α-(adamant-1-ylthio)-acetate is purified by means of distillation in high vacuum. At a pressure of 0.001 mm. Hg it distils over at 117–118°.

(c) In order to obtain the free acid, the oily crude ester, produced as described above is refluxed with 20 g. of sodium hydroxide in 400 ml. of ethanol for 5 hours. The ethanol is distilled off, the residue mixed with approximately 750 ml. of water and the aqueous phase is filtered through Hyflo. The filtrate is acidified with hydrochloric acid, the precipitated oil taken up in benzene-ether, the solution evaporated, the residue dissolved in 1000 ml. of 0.2 N aqueous sodium hydroxide solution, the solution is clarified with active carbon and filtered through Hyflo. On acidifying with hydrochloric acid, the α-(adamant-1-ylthio)-acetic acid initially precipitates in an oily form, but soon becomes solid. It is separated on a suction filter, washed to neutral with a large quantity of water and then dissolved in benzene. The benzene solution is dried with sodium sulfate. After evaporating the benzene solvent, α-(adamant-1 - ylthio)-acetic acid remains as an oil and is crystallized from hexane/pentane. Melting point 68–70°.

(d) 1.05 g. of α-(adamant-1-ylthio)-acetic acid and 0.7 ml. of triethylamine are dissolved in 12 ml. of dioxan and 10 ml. of acetone and cooled to a temperature between 0° and 5°. 0.62 ml. of isobutyl chloroformate, dissolved in 5 ml. of dioxan, are added thereto drop by drop, the whole is stirred for 15 minutes at 0° and then separated from residual triethylaminehydrochloride by filtration. A solution of 1.16 g. of 6-aminopenicillanic acid (86.1% pure) in 10 ml. of water and 1 ml. of triethylamine is added to the filtrate which is cooled to 0°. The reaction solution is stirred for 60 minutes at room temperature, a slight carbon dioxide development being constantly observed in the reaction solution. 10 ml. of water containing dissolved 1 g. sodium bicarbonate are then added and the whole is washed twice using 25 ml. of ether each time. The aqueous phase is covered with a layer of 20 ml. of methylisobutyl ketone and adjusted to pH 2.1 with 10 N sulfuric acid. After stirring the largest part of the reaction product passes over into the organic phase as free acid. The layers are separated and the aqueous phase is extracted once more using 5 ml. of methylisobutyl ketone. All methylisobutyl ketone extracts are combined, washed with 5 ml. of water and dried with sodium sulfate. The methyl isobutyl ketone solution is now shaken with a 3%-sodium bicarbonate solution until the aqueous phase has attained a pH of 6.8–7.0. The phases are separated and the organic phase is again shaken out with 5 ml. of water. The combined aqueous phases are washed with 25 ml. of ether and liberated from dissolved ether in a rotary evaporator. The clear and almost colorless solution of the resulting sodium salt of (adamant-1-ylthio)-methyl-penicillin is lyophilized.

There is obtained a white, voluminous powder, the antibiotic activity of which is determined in near accordance with the agar incorporation test described by Florey et al. in "Antibiotics," published by Oxford University Press 1949, especially pages 201–203. In this test, a culture of microorganisms grown at 37° C. for 24 hours is transferred with the aid of a velvet-covered sterile stamper to a series of sterile agar plates containing the antibiotic to be tested in varying concentrations. The inoculated plates (sub-cultures) are then incubated at 37° C for 24 hours. That concentration of the antibiotic at which growth of the respective bacterium is completely inhibited is called the "minimum inhibitory concentration."

The aforesaid final product inhibits the growth of *Staphylococcus aureus* NCTC 7447 in the above described agar incorporation test at a concentration of less than 0.01 microgram per milliliter (μg./ml.).

EXAMPLE 23

(a) 36 g. (0.2 mol) of α-bromo-propionic acid-ethylester are converted to the crude α-(adamant-1-ylthio)-propionic acid ethylester in the same manner as described in Example 22 under (b), and the crude α-(adamant-1-ylthio)-propionic acid-ethylester is boiled under reflux for approximately 14 hours with 16 g. of sodium hydroxide in 250 ml. of ethanol. The solid residue, which remains after the ethanol has been evaporated, is taken up in 250 ml. water, the resulting aqueous solution is extracted with methylene chloride, in order to remove the neutral components, it is then purified with charcoal, filtered and the filtrate acidified with concentrated hydrochloric acid. The resulting precipitate of α-(adamant-1-ylthio)-propionic acid is separated on a suction filter, recrystallized from cyclohexane and then from benzine, and then dried in high vacuum at 50° for 14 hours. Melting point 142–144°.

(b) 1.2 g. of α-(adamant-1-ylthio)-propionic acid (=8% excess calculated on 6-amino penicillanic acid) is dissolved in 5 ml. of thionyl chloride and boiled under reflux for 30 minutes. The excess thionyl chloride is evaporated in vacuo, the residue is dissolved in benzene and the latter solvent evaporated, leaving a residue which is dried in high vacuum (0.01 mm. Hg) for one hour and the resulting crude acid chloride is subsequently used without purification for the following reaction.

(c) 1.16 g. of 6-aminopenicillanic acid (86.1% pure) is dissolved in 25 ml. of water containing 3 g. of sodium bicarbonate, the solution is cooled to 0 to 5° in an ice bath, and the acid chloride produced under (b) supra, dissolved in 20 ml. of acetone, is added thereto drop by drop with vigorous stirring. After the addition, which takes about 10 minutes, the ice bath is removed and the reaction mixture is stirred for 60 minutes at room temperature. The solution is now extracted with two times 10 ml. of ether and then covered with a layer of 20 ml. of methyl isobutyl ketone. The pH of the aqueous phase is adjusted to 2.1 by adding aqueous 10 N-sulfuric acid. The free acid of α-(adamant-1-ylthio)-ethyl penicillin passes over into the organic phase. The layers are separated and the aqueous phase is extracted once with 5 ml. of methyl isobutyl ketone. The methyl isobutyl ketone solutions are combined and washed with 5 ml. of water. The sodium and the potassium salts of the α-(adamant-1-ylthio)-ethyl-penicillin [sodium, or potassium, 6-(2'-[adamant-1"-ylthio]-propionamido)-penicillanate] are obtained from the free acid in an analogous manner as described in Example 22, by extraction with aqueous sodium bicarbonate, or potassium bicarbonate solution, respectively.

Its activity is the same as that of the final product of the preceding example.

EXAMPLE 24

In the same manner described as in Example 22, step (b), the crude α-(adamant-1-ylthio)-n-caproic acid ethylester is obtained by using 45 g. (0.2 mol) α-bromocaprolic acid ethylester instead of the ethyl α-bromoacetate used therein. The crude caproate is boiled under reflux for 6 hours with 20 g. of sodium hydroxide in 400 ml. of ethanol. After evaporation of the solvent, the residue is dissolved in 250 ml. of water and purified by filtration through Hyflo. The filtrate is acidified with hydrochloric acid, the precipitated oil taken up in toluene, and the toluene solution washed with water and the solvent evaporated. The resulting residue is then dissolved in cyclohexane, and this solution is thoroughly shaken several times with a saturated potassium bicarbonate solution until no more carbon dioxide is liberated. The cyclohexane solution is extracted with a sodium carbonate solution, the solution obtained is filtered through Hyflo after the addition of charcoal, the filtrate is acidified with hydrochloric acid and the precipitated oil is taken up in ether-hexane.

The ether-hexane solvent is evaporated from the resulting solution and the residue is recrystallized from aqueous 80%-methanol at −5°. The crystals of α-adamant-1-ylthio)-n-caproic acid are made into a paste with 50 ml. methanol 80% at −10°, the excess liquor is separated on a suction filter and the residue dried at 55° in high vacuum (0.001 mm. Hg). Melting point 74–76°.

The corresponding penicillin, namely α-(adamant-1-ylthio)n-amyl-penicillin, is produced from α-(adamant-1-ylthio)-n-caproic acid in the same manner as described in Example 22, step (d). It inhibits the growth of *Staphylococcus aureus* NCTC 7447 in the agar incorporation test at a concentration of 0.1 μg./ml.

EXAMPLE 25

By using 39 g.=29.5 ml. (0.2 mol) of α-bromo-butyric acid ethylester, instead of the corresponding ethyl bromoacetate of Example 22 and proceeding in the same manner as described in Example 22, step (b), the crude α-adamant-1-ylthio)-butyric acid-ethylester is obtained. The latter is boiled under reflux for 5 hours with 16 g. sodium hydroxide in 250 ml. of ethanol, the ethanol solvent is distilled off, the residue dissolved in 500 ml. of water, the solution purified with charcoal and filtered through Hyflo. The filtrate is acidified with concentrated hydrochloric acid and extracted with benzene. The benzene solution is washed with water three times, dried with sodium sulfate and evaporated. The α-(adamant-1-ylthio)-butyric acid, which remains, is recrystallized from approximately 300 ml. of benzine and dried at a pressure of 12 mm. Hg. Melting point 113–114°.

α-(Adamant-1-ylthio)-propyl-penicillin (sodium salt) is produced from α-(adamant-1-ylthio)-n-butyric acid in the manner indicated in Example 24. In the agar incorporation test, it inhibits the growth of *Staphylococcus aureus* NCTC 7447 at a concentration of 0.1 μg./ml.

EXAMPLE 26

In the same manner as in Example 22, step (b), the crude α-(adamant-1-ylthio)-isovaleric acid ethylester is prepared by using 42 g. (0.2 mol) α-bromo-isovaleric acid ethylester instead of ethyl bromoacetate, and is boiled under reflux for 5 hours in 20 g. of sodium hydroxide in 300 ml. of ethanol. The ethanol is distilled off, the residue dissolved in 1000 ml. of water, the solution purified with charcoal, filtered through Hyflo and then acidified with concentrated hydrochloric acid. The α-(adamant-1-ylthio)-isovaleric acid precipitates initially as on oil, but soon solidifies. It is filtered off, pulverized, washed with water and then dissolved in benzene. The benzene solution is dried over anhydrous sodium sulfate and the solvent evaporated. The residue is decolorized with charcoal and recrystallized from 250 ml. of benzene and from 300 ml. of hexane and dried for 2 hours in high vacuum at 90° (0.001 mm. Hg). Melting point 134–135°.

EXAMPLE 27

The α-(adamant-1-ylthio)-isobutyric acid (from hexane) having a melting point of 141–142° is obtained, in exactly the same manner as described in the preceding Example 22, by using 39 g. (0.2 mol) of α-bromo-iso-butyric acid-ethylester.

EXAMPLE 28

In the same manner as described in Example 22, using α-bromo-β,β-dimethyl-butyric acid ethyl ester, the α-(adamant-1-ylthio)-β,β-dimethyl butyric acid is obtained.

Recrystallized from benzene, it has a melting point of 207–208°.

The latter is then converted by a treatment analogous to that described in Example 22, step (d), to the α-(adamant-1-ylthio)-β,β-dimethyl-propyl-penicillin, of similar antibacterial activity as the penicillin derivatives described in the preceding examples.

EXAMPLE 29

The crude α-(adamant-1-ylthio)-α-cyclopentyl-acetic acid-ethylester, which is obtained in the same manner as described in Example 22, step (b), by using 40 g. (0.17 mol of α-bromo-α-cyclopentyl-acetic acid-ethylester, is refluxed for 6 hours with 20 g. of sodium hydroxide in 400 ml. of ethanol. The ethanol is filtered through Hyflo, buffered with carbon dioxide to pH 8 and filtered again with addition of charcoal. The filtrate is acidified to pH 6 using concentrated hydrochloric acid, the precipitate filtered and taken up in benzene-ether and the resulting solution extracted three times with 100 ml. of potassium carbonate solution, each time. The benzene-ether solution is evaporated and the residue is decolorized with charcoal and recrystallized twice from approximately 250 ml. hexane. The α-(adamant-1-ylthio)-α-cyclopentyl-acetic acid obtained in this manner has a melting point of 136–139°.

α-(Adamant-1-ylthio)-α-cyclopentyl-acetic acid is then converted to [α-(adamant-1-ylthio)-α-cyclopentyl-methyl]-penicillin with a good degree of purity by the method described in Example 22, step (d). It inhibits the growth of *Staphylococcus aureus*, Geigy 5001 and Geigy 5003 strains (both highly resistant to penicillin G), at a concentration of 10 μg./ml., or less.

EXAMPLE 30

When 34 g. (1.2 mol) of 1-adamantanethiol in 500 ml. of warm 95% ethanol are added to a mixture of 38 g. (0.1 mol) of lead acetate $(CH_3COO)_2Pb \cdot 3H_2O$ in 500 ml. of the same solvent, the yellow lead salt precipitates. After cooling to 0° it is filtered off and washed with ethanol. After drying the precipitate at 50° in high vacuum the yield of lead salt is 52 g. 34 g. (0.063 mol) of this salt and 38 g. (0.156 mol) of α-bromophenyl-acetic acid ethyl ester in 750 ml. of absolute dioxane are refluxed for 60 hours. After cooling and filtration the filtrate is evaporated, the residue treated with hexane and separated from insoluble sludge by filtration. The filtrate is concentrated and the remaining bromoester is distilled off in high vacuum. The distillation residue (22 g.) is refluxed for 16 hours with 100 ml. of ethanol and 5 g. of sodium hydroxide. The ethanol is evaporated and the residue is treated with 500 ml. of water. The aqueous phase is filtered through charcoal. The filtrate is acidified with hydrochloric acid. The viscous precipitate is extracted with ether/benzene and evaporated. After extraction of the residue with diluted sodium bicarbonate solution and purification with charcoal, acid is added. The resulting precipitate is recrystallized from cyclohexane/hexane to give the α-(adamant-1-ylthio)-α-phenylacetic acid. Melting point 122–124°.

EXAMPLE 31

Resolution of a racemic acid: 26.8 g. of α-(adamant-1-ylthio)-isovaleric acid (obtained according to Example 26) and 12.1 g. of (+)-α-phenyl-ethyl-amine (an excess of 0.5 g.) are dissolved in 250 ml. of 50% ethanol while stirring and heating. Then the solution is left to stand in an ice bath. The precipitated salt is filtered off with suction and recrystallized three times from 50% ethanol (200 ml., 150 ml., 100 ml. respectively). Thereupon the optical rotation of the salt is $[\alpha]_D^{25}+35.8$ (c.=2,003 in ethanol).

To liberate the acid the three times recrystallized salt is dissolved in 50 ml. of ethanol, the solution is acidified with 2 N hydrochloric acid and thereupon 200 ml. of water are added. The precipitated acid is filtered off with suction, washed and dried. After recrystallization from 35 ml. of hexane, the optical rotataion of the resulting (+)-α-(adamant-1-ylthio)-isovaleric acid is $[\alpha]_D^{24}+39.6°$ (c.=1.995 in ethanol).

The combined mother liquors of the four recrystallizations are acidified with concentrated hydrochloric acid and diluted with water to double the volume. The precipitated acid is filtered off with suction, washed with water and dried. The acid and afterwards 10.4 g. of (−)-α-phenyl-ethyl-amine are dissolved in 50% ethanol while heating and stirring. Then the solution is left to stand in an ice bath. The precipitated salt is recrystallized twice from 50% ethanol (150 ml.; 100 ml. respectively, $[\alpha]_D^{24}$ −33.3° (c.=2.008 in ethanol). The twice recrystallized salt is dissolved in 50 ml. of ethanol, the solution is acidified with 2 N hydrochloric acid and diluted with 200 ml. of water. The precipitated acid is filtered off by suction, washed and dried. After recrystallization from 35 ml. of hexane, the optical rotation of the resulting (−)-α-(adamant-1-ylthio-isovaleric acid is $[\alpha]_D^{24}$ −35.6° (c.=2,001 in ethanol).

On acidifying the combined mother liquors from the above mentioned three recrystallizations with 10 ml. of concentrated hydrochloric acid, diluting with water to double the volume and filtering with suction racemic acid can be recovered.

EXAMPLE 32

16.0 g. (0.075 mol) of 1-bromo-adamantane, 80 ml. of ethyl mercapto-acetate and 10 ml. of collidine are boiled for 15 hours in a nitrogen atmosphere. After cooling the reaction mixture is diluted with 300 ml. of diethylether and is poured on 300 ml. of ice-water. After addition of 100 ml. of concentrated aqueous sodium hydroxide solution the excess of ethyl mercapto-acetate is to be found in the aqueous phase. After filtration through Hyflo the aqueous solution is evaporated, the organic phase is washed twice with diluted sodium hydroxide solution and is dried with magnesium-sulfate. The ether is evaporated and the resulting dark oil (26 g.) is refluxed for 12 hours together with 25 g. of sodium hydroxide in 300 ml. of ethanol. After evaporation of the ethanol the residue is dissolved in 500 ml. of water, clarified with charcoal and Hyflo, acidified and extracted with benzene. After evaporation, dissolving the residue in sodium bicarbonate solution, clarification with charcoal and Hyflo, acidifying and extraction with ether and after drying and evaporation of the ether 8 g. of oil are obtained which can be recrystallized from hexane and acetone. The yield amounts to 4 g. (25%); melting point and mixed melting point 69–71°.

The following substituted alkanoic acids according to the invention are prepared from the corresponding starting materials in an analogous manner to the procedure of Example 30:

Example:

(33) α-(adamant-1-ylthio)-4′-methyl-phenyl-acetic acid.
(34) α-(adamant-1-ylthio)-4′-chloro-phenyl-acetic acid.
(35) α-(adamant-1-ylthio)-4′-bromo-phenyl-acetic acid.
(36) α-(adamant-1-ylthio)-2′-methoxy-phenyl-acetic acid.
(37) α-(adamant-1-ylthio)-4′-trifluoromethyl-phenyl-acetic acid.
(38) α-(adamant-1-ylthio)-3′,5′-dimethyl-phenyl-acetic acid.

We claim:
1. A compound of the formula

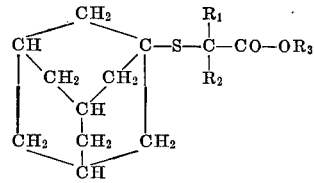

wherein
- $R_1$ is a member selected from the group consisting of hydrogen, alkyl with from 1 to 5 carbon atoms, cycloalkyl with from 5 to 6 carbon atoms, phenyl, lower alkyl phenyl, chlorophenyl, bromophenyl, lower alkoxyphenyl and trifluoromethylphenyl,
- $R_2$ is a member selected from the group consisting of hydrogen and lower alkyl, and
- $R_3$ is a member selected from the group consisting of hydrogen, lower alkyl, a monovalent cation and an equivalent weight of a polyvalent cation, each of said cations constituting together with the remainder of the above formula, a pharmacologically acceptable salt.

2. A compound as defined in claim 1, wherein both $R_1$ and $R_2$ are hydrogen.

3. A compound as defined in claim 1, wherein $R_1$ is butyl and $R_2$ is hydrogen.

4. A compound as defined in claim 1, wherein $R_1$ is methyl and $R_2$ is hydrogen.

5. A compound as defined in claim 1, wherein $R_1$ is ethyl and $R_2$ is hydrogen.

6. A compound as defined in claim 1, wherein $R_1$ is isopropyl and $R_2$ is hydrogen.

7. A compound as defined in claim 1, wherein both $R_1$ and $R_2$ are methyl.

8. A compound as defined in claim 1, wherein $R_1$ is $\alpha,\alpha$-dimethylethyl and $R_2$ is hydrogen.

9. A compound as defined in claim 1, wherein $R_1$ is cyclopentyl and $R_2$ is hydrogen.

10. A compound as defined in claim 1, wherein $R_1$ is phenyl and $R_2$ is hydrogen.

References Cited
UNITED STATES PATENTS 3,240,669    3/1966    Preau _____ 260—518

JAMES A. PATTEN, Primary Examiner

R. GERSTL, Assistant Examiner

U.S. Cl. X.R.

260—239.1, 247.1, 247.2, 293.4, 294, 326.3, 463, 470, 473, 501.1, 501.17, 501.19, 501.21, 514, 516, 520, 544, 546; 424—248, 267, 271, 274, 299, 316, 317